United States Patent Office 3,563,940
Patented Feb. 16, 1971

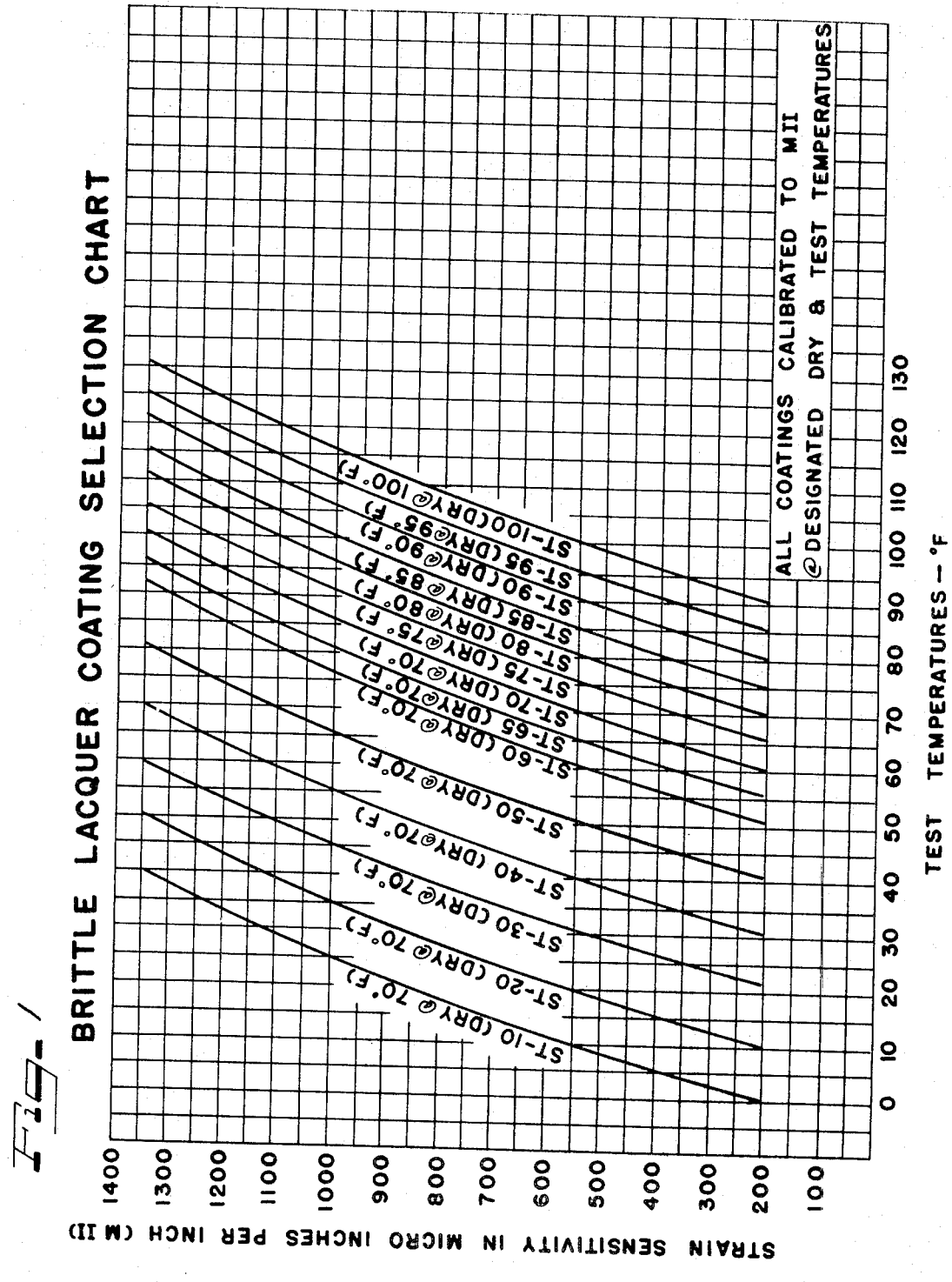

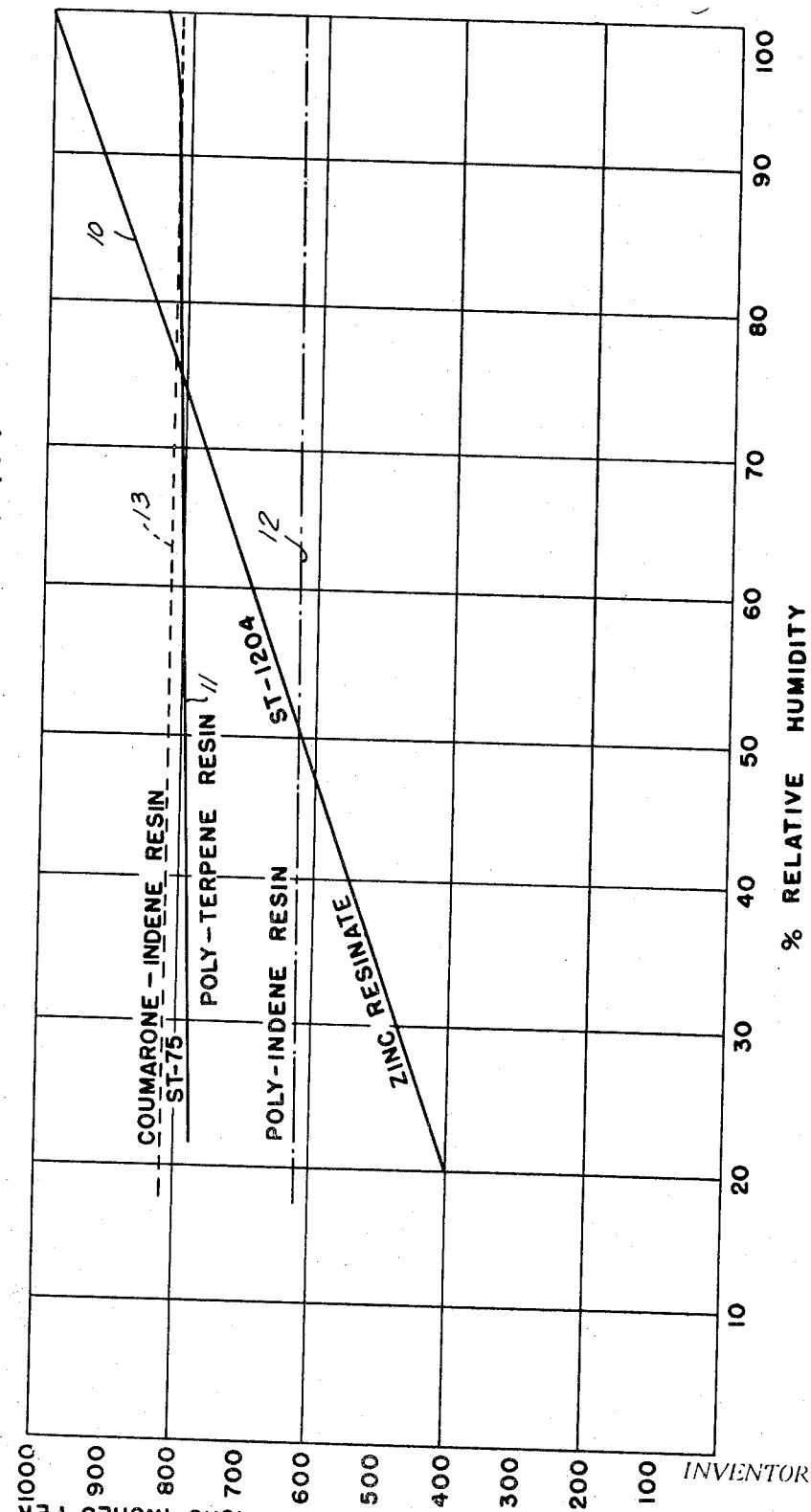

3,563,940
RESINOUS COMPOSITION FOR DETERMINING SURFACE STRAIN CONCENTRATIONS IN RIGID ARTICLES
James S. Borucki, Chicago, Ill., assignor to Magnaflux Corporation, Chicago, Ill., a corporation of Delaware
Continuation-in-part of application Ser. No. 602,703, Dec. 19, 1966. This application July 1, 1968, Ser. No. 741,629
Int. Cl. C08f *31/02;* C09d *5/20*
U.S. Cl. 260—23.3
3 Claims

ABSTRACT OF THE DISCLOSURE

A liquid resinous composition comprising a water resistant resin of suitable melting point and a plasticizer dissolved in a volatile solvent, capable of forming, when dried on the surface of a rigid article, a thin brittle film that is relatively insensitive to humidity and that, within a temperature range of 0° to 130° F., is highly sensitive to strains of 100 MII and above, and therefore useful for the determination of strain concentrations. The composition can be applied to the surface as a liquid spray or as an aerosol to build up a brittle film of between 0.004 and 0.009 inch in thickness with a myriad of minute bubbles therein that facilitate the accurate determination of surface strains.

---

This application is a continuation-in-part application of Ser. No. 602,703, filed Dec. 19, 1966 (now abandoned).

This invention relates to a resinous composition in liquid form for determining surface strain concentrations in rigid articles. More particularly, the invention relates to a liquid resinous composition adapted for application to the surface of a rigid article to form thereon, upon drying, a thin, brittle film that is substantially insensitive to relative humidity values over a range of temperatures of from about 0° to 130° F., and that is highly sensitive within the temperature range to strain values of about 100 MII and above.

The present invention constitutes an improvement over that disclosed in the Ellis Pat. No. 2,428,559, dated Oct. 7, 1947, both with respect to being substantially insensitive to humidity and being more sensitive to strains of lower value than heretofore.

In one form of my invention my liquid coating composition is prepared for use as an aerosol and for that purpose is packaged under pressure in a conventional type aerosol container provided with a suitable valve for discharging the contents of the can in the form of an aerosol. Many compressed gases, such as carbon dioxide, nitrous oxide and others can be used as the propellant, provided they have characteristics adapting them for use with the liquid composition of my invention, but I have found compressed carbon dioxide ($CO_2$) to be the most suitable propellant for my use. A sufficient amount of carbon dioxide is included in the pressurized container to develop a pressure of between 90 and 100 p.s.i. The conventional techniques, such as shaking during packaging under pressure, may be used to expedite bringing the liquid composition and $CO_2$ gas into equilibrium.

My invention also extends to the use of a liquid composition, not of the aerosol type, which can be sprayed or otherwise applied as a coating to the surface undergoing tests. Whichever type of composition is used, the composition is applied to the surface slowly in a number of passes until the final coating, after drying, forms a brittle film of uniform thickness between 0.004 and 0.009 inch, averaging about 0.006 inch for satisfactory results. Between these limits of thickness the coating will have acceptable uniformity of sensitivity to strains.

When the applied coating has completely dried, preferably using drying temperatures of between 70° and 100° F., the resulting film constitutes a brittle film that is full of very fine bubbles but free of large size bubbles; that is substantially insensitive to humidity; and that has high sensitivity toward strains from a minimum value of about 100 MII on upwards, yet avoids thermal crazing.

Strains can be applied to the surface to be tested by any of the well-known techniques, as for instance those described in the publication entitled "Principles of Stresscoat," copyrighted 1955, by Magnaflux Corporation, the assignee of the present application. That publication provides such a complete background of prior knowledge as to the then known and still practiced method of determining strain concentration in rigid articles by the use of brittle resinous coatings, that it is not necessary to repeat here the principle and mode of testing for detecting strain concentrations in rigid surfaces and computing the values of such strains.

As shown on the drawings:

FIG. 1 illustrates the properties of the resinous lacquers of my invention and constitutes a brittle lacquer coating selection chart in which the strain sensitivity of the coating is shown in micro inches per inch (MII) along the ordinate, and the test temperature in degrees F., from 0° to 130° F., along the abscissa. The generally parallel, upwardly inclined lines marked "ST" shown on this chart represent individual compositions of coatings that have been calibrated to 500 MII at the dry temperatures designated along the respective lines and at the test temperatures represented by such lines. By reference to this selection chart, the user of a liquid composition of my invention can choose the proper composition for use under the particular conditions that are to be maintained during the test period.

FIG. 2 is a humidity vs. strain sensitivity chart showing comparison test results between a prior conventional lacquer, ST–1204, of the formula disclosed in said Ellis Pat. No. 2,428,559; and brittle lacquer coating compositions of my present invention: viz., a polyterpene resin lacquer, ST–75, shown in full line; a coumarone-indene resin, shown in dotted line; and a poly-indene resin, shown in dot-dash line.

In the preparation of my liquid composition for use either as such or as an aerosol, a liquid composition is first prepared comprising a solution of a suitable resin and plasticizer system. The following are suitable resins, plasticizers and solvents for my purposes:

RESINS

Polymerized terpene hydrocarbons having a softening point (determined by the ball and ring method) preferably of about 135° C. plus or minus 10° C.

Examples of terpene hydrocarbon polymers meeting such softening temperature requirements are the following:

Croturez–D, a proprietary product of Crosby Chemical, Inc., believed to be a beta terpene hydrocarbon polymer.
Piccolyte S–135, a proprietary product of Pennsylvania Industrial Chemical Corporation, and believed to be a polymerized terpene hydrocarbon, having a softening point of 135° C. plus or minus 3° C.
NIREZ resins, proprietary products of Tenneco Chemical Co., Newport Division, and believed to be polymerized alpha, beta or mixed alpha-beta terpene hydrocarbons having melting points between 125° and 145° C.

Indene resins having melting points of between about 120° and 145° C.

Piccovar 420 EH, 130 and 145, proprietary products of Pennsylvania Industrial Chemical Corporation, Oak Brook, Ill. Piccovar resins, properly called polyindene resins and commonly referred to as coumarone indene resins, are petroleum hydrocarbon resinous products formed as homopolymers and copolymers of dienes and olefines of the aliphatic, alicyclic and monbenzenoid aryl alkene type hydrocarbons obtained from the distillates of cracked petroleum stocks. The term "polyindene" includes the Piccovar resins as a major but not the major constituent thereof. Piccovar 420 EH, 130 and 145, have, respectively, melting points by the ball and ring method of 120° C., 130° C., and 145° C.

Coumarone-indene resins, LX–509 Nevidene, AU 3–96, and LX–685 proprietary products of Neville Chemical Company and having melting points of about 145° C., about 180° C., and 145° C.

Any water resistant humidity-insensitive synthetic organic resin or blend of resins and plasticizers that have a softening point within the range of about 110° and 145° C.

This includes blends of alpha and beta terpene hydrocarbon polymers, that are available with softening points of from 132° to 138° C.

Crotez–D resin has the following typical analysis:

| | |
|---|---|
| Color | Water white. |
| Acid value | 1.0. |
| Saponification number | 0. |
| Iodine value | 70. |
| Molecular weight, approx. | 900. |
| Ball and ring melting point | 135° C. |
| Drop melting point | 142° C. |
| Ash | 0.02%. |
| Specific gravity | 0.99 to 1.00. |

PLASTICIZERS

The following plasticizers have been found suitable for use in admixture, and preferably in admixture in substantially equal parts by weight:

Normal-butyl stearate.
Tributyl phosphate.
Santicizer 141, a propietary product of Monsanto Chemical Company and believed to be an alkyl aryl phosphate.

However, either n-butyl stearate or tributyl phosphate, alone or in combination, can be used satisfactorily within the same plasticizer to a resin proportion as specified herein.

Other plasticizers than can also be satisfactorily used in place of the above designed preferred plasticizers include the following:

Santicizer 140, an alkyl aryl phosphate;
Santicizer E–15, B–16 and M–17, believed to be a glycolate;
Santicizer 160 and 165, believed to be a phthalate;
Santicizers 3, 8, and 9, believed to be sulfonamides.

All of the Santicizer products are proprietary products of Monsanto Chemical Company.

The hereinabove plasticizers designated as proprietary products of Monsanto Chemical Company are identified by that company as the following:

| Proprietary name: | Chemical name |
|---|---|
| Santicizer E–15 | Ethyl phthalyl ethyl glycolate. |
| B–16 | Butyl phthalyl butyl glycolate. |
| M–17 | Methyl phthalyl ethyl glycolate. |
| Santicizer 160 | Butyl benzyl phthalate. |
| 165 | Phthalic acid esters of mixed alcohols. |
| Santicizer 3 | N - ethyl - paratoluenesulfonamide. |
| Santicizer 8 | Mixtures of N-ethyl p-toluenesulfonamide and n-ethyl o-toluenesulfonamide. |
| Santicizer 9 | Mixtures of o- and p-toluenesulfonamides. |

SOLVENTS

While various solvents have been evaluated for use in the brittle lacquer forming composition of my invention, none has been found so satisfactory as carbon disulfide. This is the same solvent that has been used commercially for the past two decades in practicing the method of the Ellis Pat. No. 2,428,559. Such continued use of carbon disulfide has been despite its reputation of being a toxic and extremely flammable solvent. Carbon disulfide remains unique in its performance characteristics in lacquers for application to the surfaces of rigid articles to form thin brittle resin films thereon that are satisfactory for the determining of strain concentrations. As indicated in the aforementioned Ellis patent, however, it has been known for a long time that methylene chloride, by itself, or in admixture with other solvents can be used.

Furthermore, instead of the preferred solvent, carbon disulfide, cosolvent systems which are non-flammable, such as the following may be used:

SOLVENTS

| | Ratio |
|---|---|
| Chlorobromomethane/methylene chloride | 1:3 |
| Cis 1,2-dichloroethylene/methylene chloride | 2:1 |
| Trans 1,2-dichloroethylene/methylene chloride | 2:1 |
| Cis & Trans 1,2-dichloroethylene/methylene chloride | 1:1 |
| Methylene bromide/methylene chloride | 1:3 |
| Methylene iodide/methylene chloride | 1:3 |

The following formulation is illustrative of a suitable liquid composition of my invention for use as such or as a base for the aerosol type of composition:

| | Grams | Parts by weight |
|---|---|---|
| Resin | 400 | 100 |
| Plasticizer | 20 | 5–28 |
| Solvent | ¹1,260 | ¹315 |

¹ Approximately.

In making up my preferred composition of the above formula, 100 cc. of carbon disulfide, having a specific gravity of 1.261 at about 20° C., is used. The plasticizer can vary between 5 and 28 parts per 100 parts of the resin, and the amount of plasticizer used will depend upon the type of brittle coating that is desired, as will be explained more fully hereinafter. Any of the resins, plasticizers and solvents previously named herein may be used in the above formula.

Preferably, the resin should have a melting point of about 135° C. plus or minus 10° C., but somewhat lower melting point resins, as low as 110° C., and somewhat higher melting point resins, as high as 180° C., can be used by adjusting the amount of plasticizer, using high proportions of plasticizer with high melting point resins and vice versa, but keeping within the proportions of between 5 and 28 parts by weight of plasticizer per 100 parts of resin.

Where the lacquer composition is to be used as an aerosol, a sufficient amount of a propellant, such as carbon dioxide, is included in the composition of the specific formula, to develop a pressure of 90 to 100 p.s.i.g. in the packaged composition. By way of example, 5 grams of carbon dioxide gas is added to 250 cc. of the liquid composition to give an equilibrium pressure of 90 to 100 p.s.i.g.

For calibration purposes, the coating of a lacquer composition of my invention, after application to the surface to be tested, is dried at a specified temperature, as for instance at 70° F., 75° F., 80° F., 85° F., 90° F., 95° F., or 100° F., as shown in FIG. 1 by the figures along the inclined lines of the selection chart there illustrated. These temperatures are used for compositions of lacquer corresponding to the designations "ST-10," -20, -30, -40, -50, etc., as also shown in the accompanying drawing. The following table shows the "ST" coating numbers and the corresponding proportions of the ingredients of the lacquer composition:

TABLE I.—ST-SERIES COATING FORMULAS

| Ingredients | Amounts per coating number | | | | | | | | | |
|---|---|---|---|---|---|---|---|---|---|---|
| | ST-10 | ST-20 | ST-30 | ST-40 | ST-50 | ST-60 | ST-70 | ST-80 | ST-90 | ST-100 |
| Croturez D resin, gram | 400 | 400 | 400 | 400 | 400 | 400 | 400 | 400 | 400 | 400 |
| Plasticizer system,[1] gram | 112 | 96 | 80 | 64 | 52 | 41 | 32 | 28 | 24 | 20 |
| Carbon, centimeter | 1,000 | 1,000 | 1,000 | 1,000 | 1,000 | 1,000 | 1,000 | 1,000 | 1,000 | 1,000 |

[1] The plasticizer system is made up of equal parts of: n-butyl stearate, tributyl phosphate, and Santicizer 141.

It will be noted that the proportions by weight of plasticizer to resin, as given in the foregoing table are in the same range of 5 to 28 parts by weight of plasticizer per 100 parts by weight of resin as is given in the first formulation above set forth. In general, the higher the proportion of plasticizer to resin in the resin-plasticizer system, the lower the temperature of testing may be, or the higher the softening point of the resin can be for a given temperature of testing. Thus, the "ST-10" lacquer would be used at temperatures between 0° and 40° F., whereas at the other end of the series, the "ST-100" lacquer would be used at ambient temperatures of from 90° to 130° F. All of the various coatings of these ST-series of lacquers were calibrated to a sensitivity of 500 MII, and the values for the selection chart were determined at the dry and test temperatures shown on the chart. The results of such testing were used in plotting the inclined lines that appear on said chart.

In place of the Croturez-D resin of Table 1 any of the other resins that have been identified hereinabove as terpene, coumarone-indene, or poly-indene resins can be used in comparable proportions to the plasticizer system and solvent with comparable results.

For optimum results in the application of my brittle-lacquer forming composition, it is preferable when the composition is applied by spray or as an aerosol, to apply the coating with several even passes to an average final, dry coating thickness of about 0.006 inch. Extremely thin coatings of under 0.004 inch and extremely heavy coatings of over 0.009 inch can be used although not so desirably. If the coating is applied by an air gun, the average air pressure should be around 5 to 12 p.s.i., or within a range of from 5 to 20 p.s.i., and the gun should be held at an average distance of three inches from the test specimen. The distance of the spray gun to the specimen can vary from approximately one inch up to ten inches, depending upon the physical makeup of the part being coated.

All of the coatings should be air dried for a period of about 18 hours, the temperature of the air being maintained during that period at the respective temperatures shown on the chart of the drawing.

In the application of an aerosol type of liquid resinous composition, the can nozzle is held at a distance of from 4 to 8 inches from the surface of the test specimen, the spraying being accomplished by moving the spray rapidly and evenly in successive passes over the surface until a coating has built up slowly with several passes to an average coating thickness of 0.006 inch.

The aerosol type of lacquer compositions functions in the same way as the non-aerosol type which has been used industrially for years. The lacquers from characteristic crack patterns at right angles to the principal tension stresses when the test part is loaded. Under static load conditions the crack patterns can be used for determining both tension and compression strains. Under dynamic load conditions, however, only tension strains are measurable.

All of the brittle coatings, whether provided by the aerosol or the non-aerosol type of resin lacquer compositions, function completely independently of humidity conditions to give reliable strain indications at temperatures between 0° and 130° F. The thermal craze point of these various lacquer coatings is less than 200 MII and even as low as between 90 and 110 MII. Thermal crazing is characterized by a random pattern of more or less connected lines of craze and is readily distinguished from the generally parallel lines that are formed by strains when the lacquer is stressed beyond its elastic limits.

As shown in FIG. 2, all lacquers of my invention show a substantially constant strain sensitivity, MII, independent of the percent relative humidity between about 22% and 100% relative humidity, while a standard lacquer, identified as ST-1204, used in the commercial practicing of the method of said Ellis patent is much more sensitive to changes in relative humidity.

The composition of ST-1204, represented by the line 10, was the following:

| | Parts by weight |
|---|---|
| "Zitro" resin (a zinc resinate) | 148 |
| Dibutyl phthalate | 13 |
| Carbon disulfide | 352 |
| | 513 |

Lacquer ST-75, a poly-terpene resin lacquer, represented by the full line 11, had the following specific formula:

"Croturez-D" resin—400 gm.
Plasticizer system [1]—32 gm.
Carbon disulfide—1000 cc.

[1] The plasticizer system for ST-75 was equal parts by weight of: n-butyl stearate, tri-butyl phosphate, and "Santicizer" 141.

A poly-indene resin lacquer, dried at 80° F. and tested at 80° F. and represented by the dot-dash line 12, had the following formula:

"Piccovar 145" resin—400 gm.
Plasticizer (same as system [1] above)—36 gm.
Carbon disulfide—1000 cc.

A coumarone-indene resin lacquer, dried at 80° F. and tested at 80° F. and represented by the dotted line 13, had the following formula:

"Nevidene LX-509" resin—400 gm.
Plasticizer (same as system [1] above)—48 gm.
Carbon disulfide—1000 cc.

The chart of FIG. 2 shows that the above compositions represented by lines 11, 12 and 13 exhibit a maximum change of 50 MII between relative humidity percentage limits of 22% to 100%, while the standard lacquer ST-1204 of said Ellis patent exhibits changes of 600 MII from 22% to 100% relative humidity.

The test results shown on said chart, FIG. 2, thus evidence, that the brittle lacquers of the present invention act completely independently of humidity within substantially the entire broad range of between 22% and 100% relative humidity, with the result that the use of these brittle, humidity-insensitive resins makes the selection of the proper coating composition and the testing therewith for stress concentrations on or in the work piece much easier and significantly less susceptible to error in the evaluation of the results obtained.

The inherent chemical and physical properties of the present brittle lacquer compositions allow testing at strain sensitivity levels as low as 100 to 110 MII without thermocrazing. This represents a great advantage over the Ellis lacquer compositions, which in the form of thin film lacquers, exhibited thermal craze at from about 400 to 350 MII.

Furthermore, the aerosol form of the present lacquers provides not only great convenience but gives entirely predictable results, whereas the Ellis lacquers gave completely unpredictable results under identical conditions of testing. The performance characteristics of the lacquers of my invention are so demonstrably superior to those of the Ellis patent as to be completely surprising and unexpected.

It will be understood that variations and modifications may be effected without departing from the spirit and scope of the novel concepts of this invention.

I claim as my invention:

1. An improved liquid resinous composition capable of drying to a substantially humidity insensitive, brittle film coating having high sensitivity to strains and adapted for use in measuring surface strain concentrations in a rigid article when said composition is coated upon the surface thereof and dried to a film coating of from 0.004 to 0.009 inch in thickness, said liquid resinous composition consisting essentially of the following ingredients in solution, a humidity insensitive synthetic resin having a softening point of between about 110° and 180° C. selected from the group consisting of terpene hydrocarbon polymers, polyidene and coumarone-idene resins, and mixtures thereof; a plasticizer for said resin selected from the members of the group consisting of n-butyl stearate, tri-butyl phosphate, alkyl aryl phosphates, ethyl phthalyl ethyl glycolate, butyl phthalyl butyl glycolate, methyl phthalyl ethyl glycolate, butyl benzyl phthalate, phthalic acid esters of mixed alcohols, N-ethyl-para-toluenesulfonamide, mixtures of N-ethyl p-toluenesulfonamide and N-ethyl o-toluenesulfonamide, mixtures of o- and p-toluenesulfonamides and mixtures of said group members, said plasticizer being within the range of proportions of from 112 to 20 parts by weight of plasticizer to 400 parts by weight of said resin and in an amount that decreases within said range as the temperature of drying said film coating increases within the range of from 70° to 100° F., the amount being sufficient to impart to the dried film coating a high degree of sensitivity to strains of about 100 MII and above, within a temperature range between 0° and 130° F.; and a volatile solvent selected from the group consisting of carbon disulfide, a co-solvent system of chlorobromomethane/methylene chloride; a cosolvent system of cis 1,2 dichloroethylene/methylene chloride; a cosolvent system of trans 1,2 dichloroethylene/methylene chloride; a cosolvent system of methylene bromide/methylene chloride; and a cosolvent system of methylene iodide/methylene chloride; said dried film coating when subjected to a strain of between 200 and 1000 MII at temperatures between 0° and 130° F. exhibiting strain sensitivities comparable to those delineated by the upwardly inclined lines on FIG. 1 of the accompanying drawing for compositions dried at the temperatures designated in the legends.

2. A liquid composition as defined by claim 1, wherein the softening point of the synthetic resin selected is from about 125° to about 145° C., the plasticizer is selected from the group consisting of n-butyl stearate, tri-butyl phosphate, alkyl aryl phosphates and mixtures thereof, and the solvent is carbon disulfide.

3. A liquid composition as defined by claim 3, wherein said synthetic resin is a terpene hydrocarbon polymer having a melting point between 132° and 138° C.

References Cited

UNITED STATES PATENTS

| | | | |
|---|---|---|---|
| 2,346,995 | 4/1944 | Palmer et al. | 260—105 |
| 2,428,559 | 10/1947 | Ellis | 106—240 |
| 3,220,994 | 11/1965 | Clark et al. | 260—93.3 |
| 3,406,122 | 10/1968 | Racine | 252—408 |

OTHER REFERENCES

Armitage, Paint Technology, vol. IV, No. 104, August 1944, pp. 169–171.

Rubber World, Materials and Compounding Ingredients for Rubber and Plastics, p. 328 (1965).

M. J. WELSH, Primary Examiner

R. W. GRIFFIN, Assistant Examiner

U.S. Cl. X.R.

73—88; 117—132, 161; 252—408; 260—29.8, 30.6, 30.8, 31.2, 31.6, 31.8, 32.6, 33.8, 93.3